(12) United States Patent
Rangaiah (10) Patent No.: US 11,297,562 B2
(45) Date of Patent: Apr. 5, 2022

(54) METHOD OF RECEIVING COMMUNICATIONS

(71) Applicant: Arm Limited, Cambridge (GB)

(72) Inventor: Raghavendra Magadi Rangaiah, Cambridge (GB)

(73) Assignee: Arm Limited, Cambridge (GB)

( * ) Notice: Subject to any disclaimer, the term of this patent is extended or adjusted under 35 U.S.C. 154(b) by 116 days.

(21) Appl. No.: 16/648,219

(22) PCT Filed: Aug. 2, 2018

(86) PCT No.: PCT/GB2018/052216
§ 371 (c)(1),
(2) Date: Mar. 17, 2020

(87) PCT Pub. No.: WO2019/058092
PCT Pub. Date: Mar. 28, 2019

(65) Prior Publication Data
US 2020/0288383 A1    Sep. 10, 2020

(30) Foreign Application Priority Data

Sep. 22, 2017   (GB) ...................................... 1715411

(51) Int. Cl.
*H04W 48/16*       (2009.01)
*H04L 5/00*        (2006.01)
(Continued)

(52) U.S. Cl.
CPC ............. *H04W 48/16* (2013.01); *H04L 5/001* (2013.01); *H04W 24/08* (2013.01);
(Continued)

(58) Field of Classification Search
CPC ........ H04W 48/16; H04W 24/08; H04L 5/001
See application file for complete search history.

(56) References Cited

U.S. PATENT DOCUMENTS

2004/0203839 A1\* 10/2004 Ostberg ................ H04W 48/16
                                                        455/437
2010/0233962 A1\* 9/2010 Johansson ........... H04W 52/343
                                                        455/63.1
(Continued)

FOREIGN PATENT DOCUMENTS

WO      2016130312 A1     8/2016

OTHER PUBLICATIONS

Nokia et al: Non-anchor carrier enhancements "3GPP TSG-RAN WGI Meeting #86, Aug. 22 to 26, 2016 Item 7.2.11 3, Nokia, Alcatel-Lucent Shanghai Bell R1-166592".
(Continued)

*Primary Examiner* — Kevin C. Harper
(74) *Attorney, Agent, or Firm* — EIP US LLP (57) ABSTRACT

Aspects of the present disclosure relate to a method in a terminal configured to receive transmissions from a telecommunications network. The method comprises receiving a transmission on an anchor carrier, the transmission including control information. The method comprises receiving, on the anchor carrier, an allocation of a non-anchor carrier for receiving data, wherein the non-anchor carrier has a frequency. The method comprises performing a cell search operation, comprising scanning a plurality of frequencies for a cell of the telecommunications network, and inhibiting the frequency of the non-anchor carrier in the scanning.

12 Claims, 8 Drawing Sheets

(51) Int. Cl.
*H04W 24/08* (2009.01)
*H04W 72/04* (2009.01)
*H04W 72/10* (2009.01)

(52) U.S. Cl.
CPC ....... *H04L 5/0098* (2013.01); *H04W 72/0453* (2013.01); *H04W 72/10* (2013.01)

(56) References Cited

U.S. PATENT DOCUMENTS

| | | | | |
|---|---|---|---|---|
| 2012/0046027 | A1* | 2/2012 | Baker | H04W 72/042 455/422.1 |
| 2013/0109372 | A1* | 5/2013 | Ekici | H04W 24/10 455/422.1 |
| 2016/0105843 | A1* | 4/2016 | Xue | H04W 4/02 455/426.1 |
| 2017/0215132 | A1* | 7/2017 | Moisanen | H04B 7/0613 |
| 2017/0265204 | A1* | 9/2017 | Paria | H04W 48/20 |
| 2018/0376484 | A1* | 12/2018 | Beale | H04W 72/0473 |
| 2019/0386788 | A1* | 12/2019 | Kwak | H04B 1/713 |

OTHER PUBLICATIONS

Nsn et al: "Way Forward for Hetnet Re-establishment Enhancements" 3GPP Draft; R2-134097 Way Forward for Reestablishment Enhancements, 3rd Generation Partnership Project (3GPP), Mobile Competence Centre; XP050736896.

Ericsson et al.: "Cell selection at re-establishment", 3GPP Draft; R2-132684—Cell Selection At Re-establishment, 3rd Generation Partnership Project (3GPP), Mobile Competence Centre; XP050718282.

International Search Report and Written Opinion dated Oct. 26, 2018 for PCT Application No. PCT/GB2018/052216.

* cited by examiner

METHOD OF RECEIVING COMMUNICATIONS

CROSS REFERENCE TO RELATED APPLICATION(S)

This application is a U.S. national stage entry under 35 U.S.C. § 371 of PCT International Patent Application No. PCT/GB2018/052216 filed Aug. 2, 2018, which claims priority to United Kingdom Patent Application No. 1715411.3, filed on Sep. 22, 2017. The contents of the aforementioned applications are incorporated herein by reference in their entirety.

TECHNICAL FIELD

The present disclosure relates to methods, apparatus and computer readable storage media for receiving transmissions from a telecommunications network.

BACKGROUND

In order to connect to a telecommunications network, a terminal may perform a cell search operation. As a consequence of the range of transmission frequencies used for a given telecommunications technology, a cell search operation typically requires a terminal to scan frequencies across the entire range used by that network, in order to identify local base stations. This scanning can be time consuming and can also represent a significant drain on the battery, time and processing resources of the terminal.

There is thus a need for an improved cell search operation, with reduced requirements in terms of time, processing resources and/or power resources.

SUMMARY

According to a first aspect of the present disclosure, there is provided a method in a terminal configured to receive transmissions from a telecommunications network, the method comprising:
 receiving a transmission on an anchor carrier, the transmission including control information;
 receiving, on the anchor carrier, an allocation of a non-anchor carrier for receiving data, wherein the non-anchor carrier has a frequency; and
 performing a cell search operation, comprising:
  scanning a plurality of frequencies for a cell of the telecommunications network; and
  inhibiting the frequency of the non-anchor carrier in the scanning.

According to a further aspect of the present disclosure, there is provided a terminal for use in a telecommunications system, the terminal comprising:
 a receiver configured to:
 receive a transmission on an anchor carrier, the transmission including control information;
 receive, on the anchor carrier, an allocation of a non-anchor carrier for receiving data, wherein the non-anchor carrier has a frequency;
 a memory configured to store the frequency of the non-anchor carrier; and
 a cell search module configured to perform a cell search comprising:
  scanning a plurality of frequencies for a cell of the telecommunications network; and
  inhibiting the frequency of the non-anchor carrier in the scanning.

According to a further aspect of the present disclosure, there is provided a non transitory computer-readable storage medium comprising a set of computer-readable instructions stored thereon which, when executed by at least one processor of a terminal of a telecommunications network, cause the at least one processor to:
 receive a transmission on an anchor carrier, the transmission including control information;
 receive, on the anchor carrier, an allocation of a non-anchor carrier for receiving data, wherein the non-anchor carrier has a frequency; and
 perform a cell search operation, comprising:
 scanning a plurality of frequencies for a cell of the telecommunications network; and
 inhibiting the frequency of the non-anchor carrier in the scanning.

BRIEF DESCRIPTION OF THE DRAWINGS

Further features and advantages of embodiments will become apparent from the following description of preferred embodiments, given by way of example only, which is made with reference to the accompanying drawings.

DETAILED DESCRIPTION

Examples in accordance with embodiments of the disclosure include telecommunication network technologies which may utilise a range of frequencies for transmissions between base stations and terminals. For example, neighbouring base stations of a network can be configured to transmit using different frequency ranges, in order to reduce interference between transmissions from neighbouring base stations. A frequency band is typically defined for a given telecommunications technology, such as 3GPP LTE, for example by government regulation. This wide band may be divided into smaller bands, each being assigned to a given Public Land Mobile Network (PLMN). A given PLMN can then configure the usage of the frequencies assigned to it. For example, base stations for which high data transmission rates are expected to be required, such as those in urban locations, may be assigned a wider range of frequencies than base stations for which lower transmission rates are required, for example those in rural areas. A quantum of frequency range that may be assigned for a particular communication link between a base station and a terminal may be termed a carrier.

Examples in accordance with embodiments of the disclosure include Internet of Things (IoT) terminals, in which the terminal is embedded in an object. Such objects take a large variety of types, including fixed objects such as lights and household appliances, and mobile objects such as tracking devices for asset monitoring and remote health monitoring devices such as a pacemaker or wearable medical device. Due to their nature many IoT devices, in particular when embedded in mobile objects with limited access to power, typically have limited power and processing resources.

IoT systems in accordance with examples are characterised by having a large number of terminals, each of which requires a relatively small uplink and/or downlink data rate. For example, a remote health monitoring device may report its status at regularly spaced intervals such as daily or hourly. Examples in accordance with certain IoT communication technologies, such as 3GPP LTE Narrowband Internet of Things (NB-IoT), may be optimised for such a network configuration by providing a larger number of carriers than a conventional telecommunications network, each of which corresponds to a narrower frequency range than a carrier of a conventional network. Whilst this may improve network performance in an IoT system, it also increases the number of frequencies which must be scanned during a cell search operation and thus increases the time, and processing and power resources, required.

Figure 1:
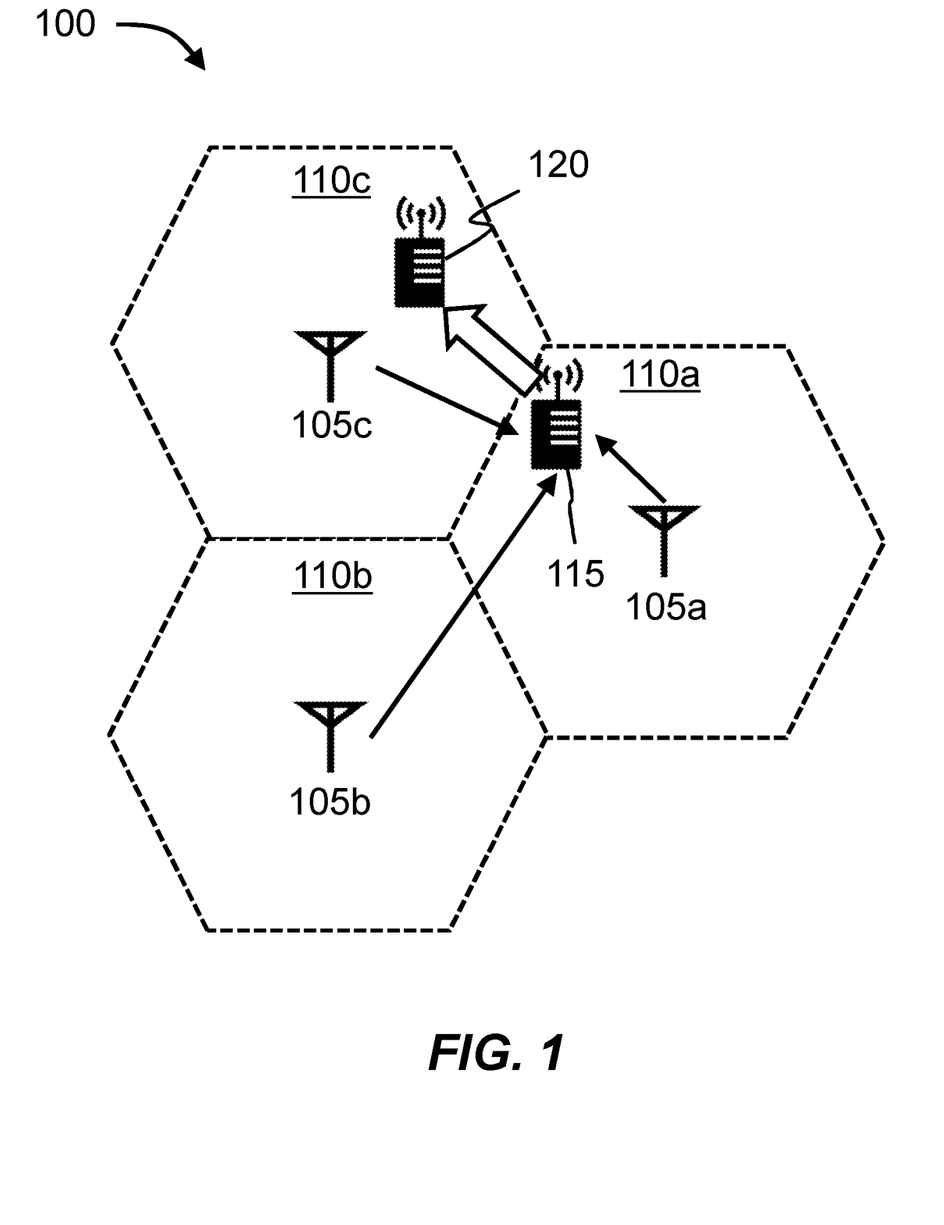
FIG. 1 shows a schematic representation of a cellular telecommunication network.

FIG. 1 shows a schematic representation of a cellular telecommunication network 100, such as a 3GPP LTE (Long Term Evolution) network, in accordance with an example. The network comprises a number of base stations 105a, 105b, 105c. Each base station 105a, 105b, 105c has a corresponding land area 110a, 110b, 110c, referred to as a cell. A terminal 115 may be described as being connected to a base station 105a, 105b, 105c, or to the corresponding cell 110a, 110b, 110c.

A terminal 115 is located within cell 110a. As such, the reception quality will typically be highest for transmissions to and from base station 105a, and so it is desirable for the terminal to be connected to base station 105a. Base stations 105b, 105c are located further from the terminal 115, and so transmissions to and from these base stations 105b, 105c will typically have a correspondingly lower reception quality. As noted above, in order to connect to a telecommunications network 100, a terminal 115 may perform a cell search operation in order to identify local base stations 105a, 105b, 105c with which the terminal can establish communication. For example, a cell search operation is performed when the terminal 115 is switched on and thus not initially connected to the network 100. Cell search operations can also be performed while the terminal is connected to a cell 110a, in order to determine the reception quality of nearby cells 110b, 110c to which the terminal 115 is not connected. For example, if the terminal 115 moves to position 120 located within cell 110c, transmissions to and from base station 105c are likely to have a higher reception quality than those to and from base station 105a. If the nearby cell 110c is indeed determined to have a higher reception quality than the cell 110a to which the terminal is connected, the terminal 115 can be connected to that nearby cell 110c via a handover or reselection operation.

Figure 2:
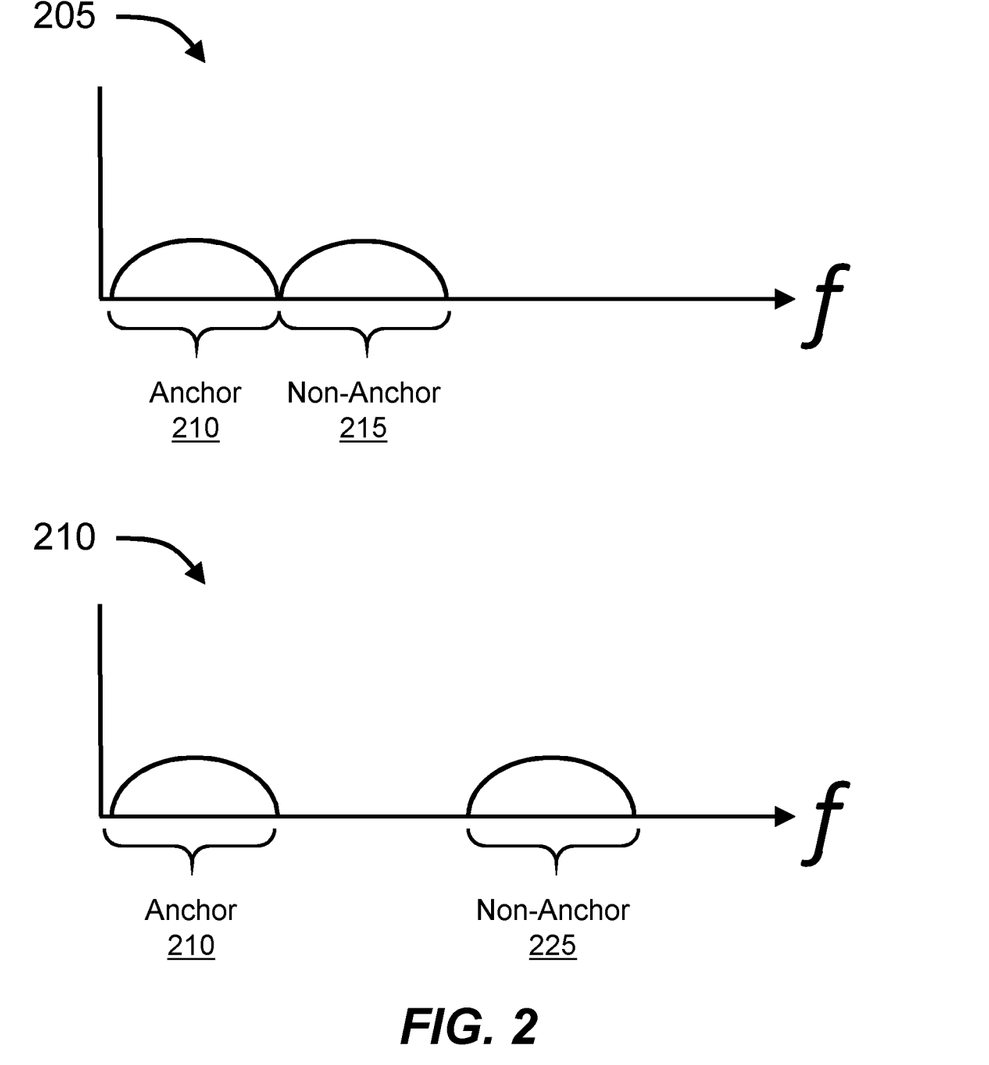
FIG. 2 shows a schematic representation of frequency allocation within a network.

FIG. 2 shows a schematic representation of frequency allocation within a network. As mentioned above, a quantum of frequency range that may be assigned for a particular communication link between a base station and a terminal may be termed a carrier. In some networks, for example 3GPP LTE networks, a given base station can be configured to allocate multiple carriers to a given terminal, in order to increase the available data rate. In 3GPP LTE, this is referred to as carrier aggregation. Typically, a terminal is allocated an anchor carrier on which control information and user data can be transmitted. The additional carriers that are allocated are configured to transmit user data and not control data, and may be termed non-anchor carriers. As a consequence of the different frequencies allocated to each carrier, each carrier appears to a terminal as a separate cell.

FIG. 2 shows two examples of frequency allocation to anchor and non-anchor carriers. In the first example 205, an anchor carrier and a non-anchor carrier are assigned adjacent frequency ranges 210, 215. In the second example 220, an anchor carrier and a non-anchor carrier are assigned non-adjacent frequency ranges 210, 225. In this way, the frequencies assigned to a given PLMN can be efficiently utilised, even if they are spread across multiple discontinuous ranges.

As described in more detail below, a terminal uses control information to detect and connect to a cell. During a cell search operation, a terminal can therefore detect and connect to a cell on an anchor carrier, but not a non-anchor carrier.

In order to reduce inter-cell interference, the frequencies used in cells of a PLMN are generally planned such that, at any given point in time, nearby cells do not use the same frequencies as each other. A consequence of this is that, during a cell search operation, a terminal is unlikely to detect any cells at a frequency that has corresponded to a non-anchor carrier. However, the frequency allocations within a network can change over time and over geographical distance, and so a list of non-anchor frequencies cannot simply be loaded into the terminal for example during manufacture.

Figure 3:
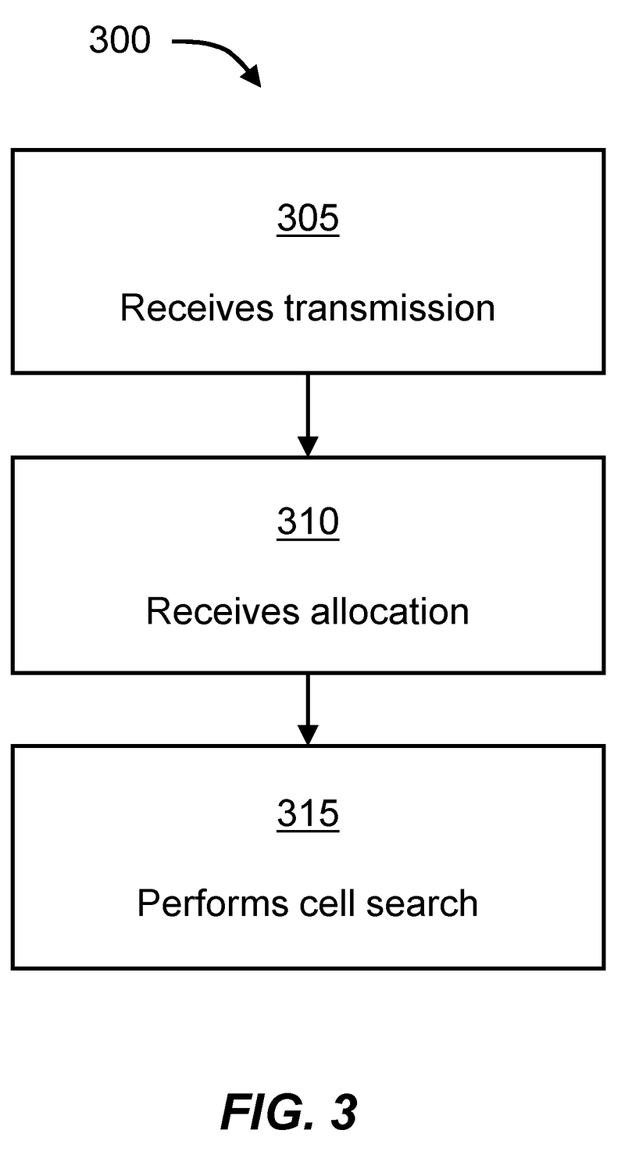
FIG. 3 shows a schematic representation of a method in a terminal configured to receive transmissions from a telecommunications network.

FIG. 3 shows a schematic representation of a method 300 in a terminal configured to receive transmissions from a telecommunications network.

The method 300 comprises a step 305 of receiving a transmission on an anchor carrier. The transmission includes control information.

The method 300 comprises a step 310 of receiving, on the anchor carrier, an allocation of a non-anchor carrier for receiving data, as described above. The anchor carrier has a frequency.

The method 300 comprises a step 315 of performing a cell search operation. The cell search operation comprises scanning a plurality of frequencies for a cell of the telecommunication network. The frequency of the non-anchor carrier is inhibited in the scanning. In some examples, the method 300 comprises adding the frequency of the non-anchor carrier to a non-anchor carrier set, the members of which are to be inhibited in the scanning.

In this manner, the terminal can build up information regarding frequencies that are used for non-anchor carriers, and inhibit these frequencies in the cell search operation. The likelihood of promptly detecting and connecting to a cell at a frequency corresponding to an anchor carrier is thus increased, which reduces the time, and processing and power resources, required for a cell search operation.

An example cell search operation utilising such a method 200 will now be described.

A terminal begins the cell search operation by determining a received power level at each of a range of frequencies at which a cell might be detected. For example, in a 3GPP LTE NB-IoT system, the terminal determines the received power level over the entire band of frequencies assigned to that system.

Figure 4:
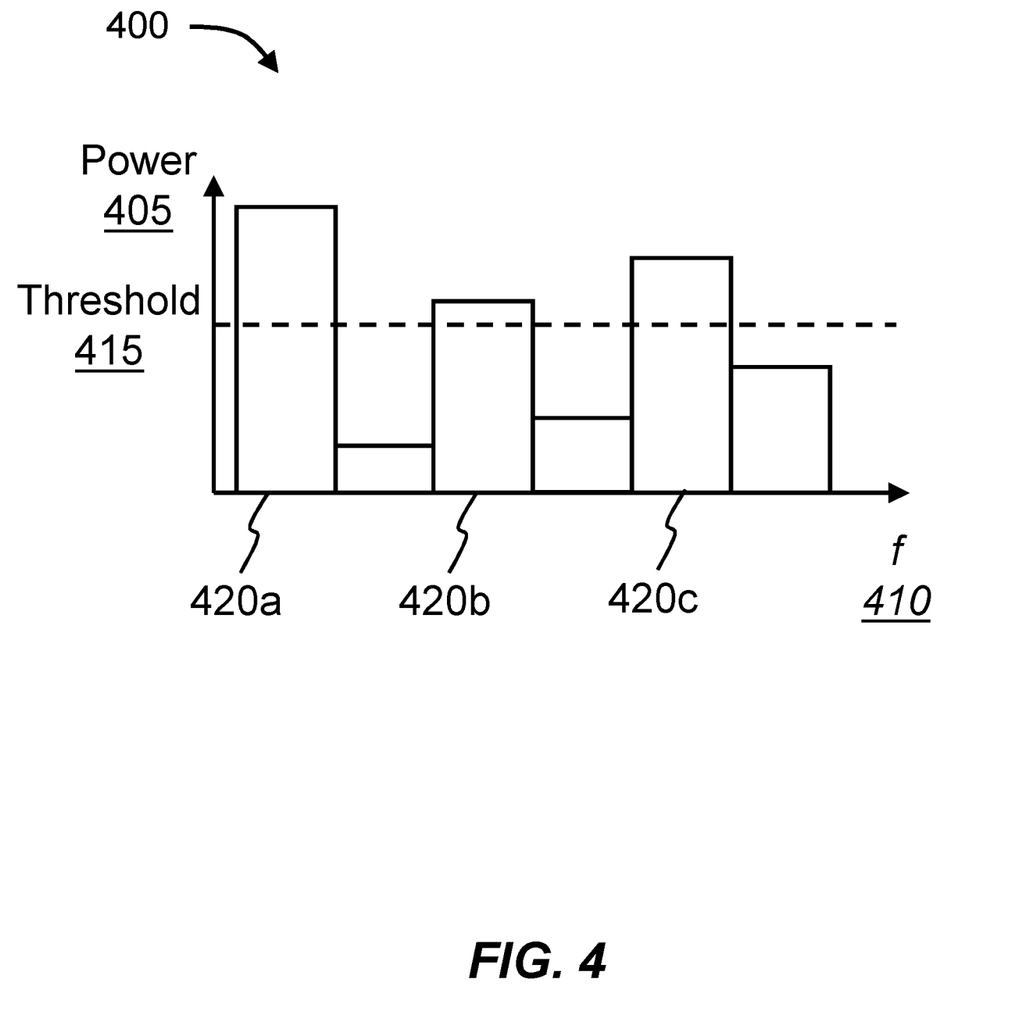
FIG. 4 shows a schematic representation of a received power at each of a range of frequencies.

FIG. 4 shows a schematic representation 400 of a received power 405 at each of a range of frequencies 410. The terminal determines the frequencies for which the received power level is above a threshold 415 for a minimum acceptable connection quality. The threshold may be determined by the terminal, or alternatively may be provided by the network.

Frequencies 420*a*, 420*b*, 420*c* have received power above the threshold 415. The remaining frequencies have received power below the threshold 415 and can be ignored or de-prioritised in the cell search procedure.

The terminal then scans the frequencies 420*a*, 420*b*, 420*c* in turn for a cell, with frequencies of a non-anchor carrier set being inhibited as outlined above. For example, if frequency 420*c* is in the non-anchor carrier set, it is inhibited in the scanning.

In some examples, the order of scanning of the frequencies 420*a*, 420*b*, 420*c* is determined based on the received power level. For example, inhibition of non-anchor frequencies notwithstanding, the frequency with the highest received power level may be scanned first, followed by the frequency with the second-highest received power level, and so on.

In examples, the inhibiting comprises excluding the non-anchor carrier from the scanning. As such, if frequency 420*c* is in the non-anchor carrier set, the terminal scans frequency 420*a* (with the highest received power level) followed by frequency 420*b* (with a power level below that of frequency 420*a* and also below that of the excluded frequency 420*c*). Frequency 420*c* is not scanned.

In other examples, the plurality of scanned frequencies includes the frequency 420*c* of the non-anchor carrier. Inhibiting the frequency 420*c* of the non-anchor carrier then comprises assigning a first priority to the non-anchor carrier 420*c* and assigning at least one second priority to the other frequencies 420*a*, 420*b*. The at least one second priority is higher than the first priority. The terminal then scans the frequencies in an order based on the assigned first and second priorities.

In one such example, priorities are assigned such that frequencies 420*a*, 420*b* are scanned first in an order based on their received power level, followed by frequencies 420*c* in the non-anchor frequency set. Frequency 420*a* is thus scanned first as it has the highest power level, followed by frequency 420*b*, followed by frequency 420*c*. The likelihood of promptly detecting a cell is thus improved, whilst still scanning frequencies of the non-anchor set if no cell is detected on the other frequencies. The frequencies of the non-anchor set can thus be de-prioritised without being excluded entirely. This improves the likelihood of detecting a cell, as it may be the case that a frequency that was previously used for a non-anchor carrier is now used for an anchor carrier, in particular if a relatively long time has elapsed or if the terminal has moved geographically since that frequency was added to the non-anchor set.

In a related example priorities are assigned to the frequencies 420*a*, 420*b* that are not in the non-anchor set, based on whether a transmission has been received on an anchor carrier with that frequency within a time window prior to performing the cell search. A greater priority can thus be assigned to frequencies on which transmissions have recently been received on an anchor carrier, as a cell is more likely to be detected on such frequencies. For example, if a transmission has recently been received on an anchor carrier with frequency 420*b*, the terminal may assign a higher priority to frequency 420*b* than to frequency 420*a*, despite the higher power of frequency 420*a*. The time window may be set based on an expected time between frequency reconfiguration operations in a network.

In some examples, the non-anchor carrier set is dynamically altered. The dynamic altering comprises determining that a removal condition has been met and, responsive to the determining, removing a frequency of a non-anchor carrier from the non-anchor carrier set. This removal allows account to be taken of changing frequency allocations such that a given frequency is not permanently excluded once it is added to the non-anchor charrier set.

In one example, the removal condition is that a time elapsed since adding a given non-anchor carrier frequency to the non-anchor set exceeds a threshold. Alternatively, or additionally, a removal condition can be that a distance travelled by the terminal since adding a given frequency to the non-anchor carrier set exceeds a threshold. This distance may for example be determined via a Global Positioning System module in the terminal. Account can thus be taken of the likelihood that a frequency that was previously used for a non-anchor carrier is now used for an anchor carrier; this likelihood increases with time (as the frequencies of the network can be reconfigured from time to time) and with distance travelled (as the frequencies of the network are typically planned to not be re-used locally, as opposed to globally).

In some examples, the terminal is configured to receive an indication of a frequency of a non-anchor carrier, and add that frequency to the non-anchor carrier set. This allows the network to inform the terminal of particular frequencies which are used for non-anchor carriers. The terminal can thus add these frequencies to the non-anchor carrier set, without having received any specific allocation of non-anchor carriers on these frequencies.

The scanning of frequencies comprises determining whether transmissions from a cell can be detected at that frequency. Typically, a cell transmits synchronisation information to facilitate this detecting.

Figure 5:
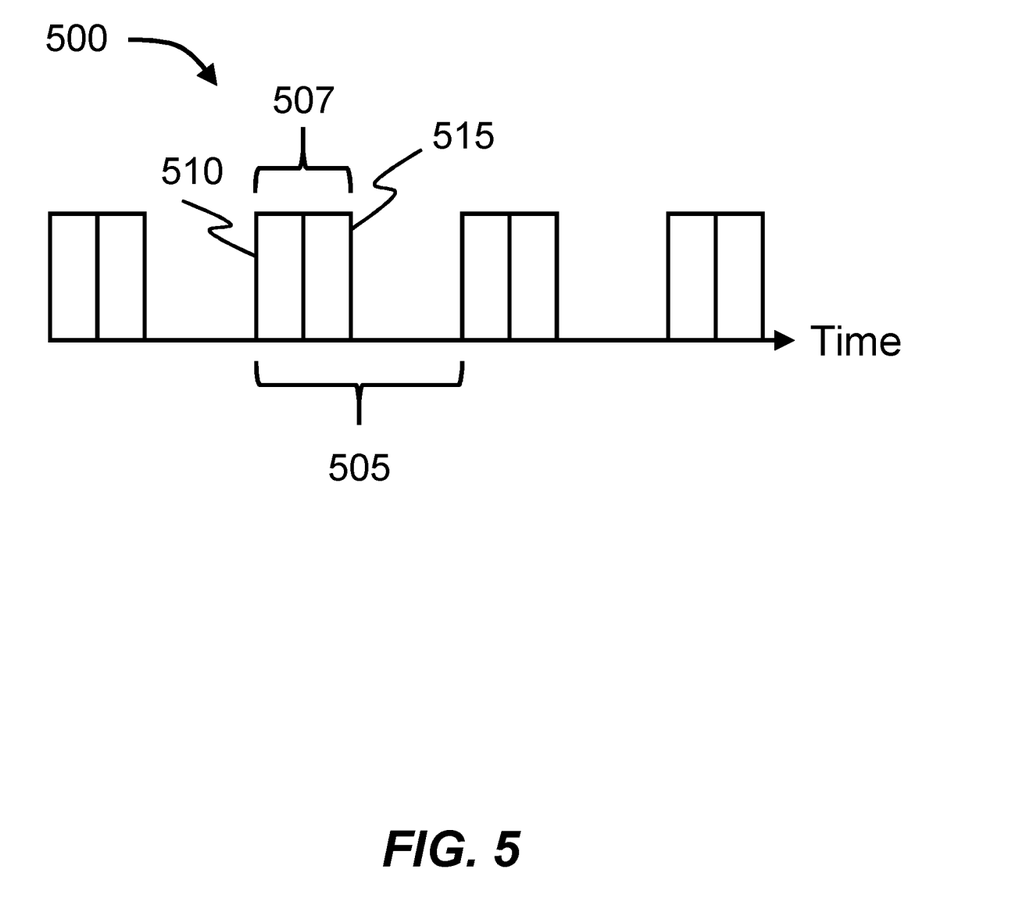
FIG. 5 shows an example transmission from a cell as a function of time.

FIG. 5 shows an example transmission from a cell as a function of time. The transmission is divided into frames 505. At the same position in each frame is transmitted a synchronisation signal 507, which the terminal attempts to detect. This allows the terminal to synchronise to the frame timing of transmissions from the cell.

In some systems, the synchronisation signal is also used to provide additional information to facilitate the connection of the terminal to the cell. For example, in 3GPP LTE, the synchronisation signal 507 comprises a primary synchronisation signal 510 (PSS) and a secondary synchronisation signal 515 (SSS). The PSS is one of three possible codes, specifically length-63 Zadoff-Chu sequences extended with five zeroes at the edges. This signal is typically identified before the SSS, as the small number of possible codes allows the terminal to efficiently scan every possible frame timing for the PSS.

After determining the PSS, the terminal identifies the SSS. The SSS is one of 168 possible codes, based on the frequency interleaving of two length-31 m-sequences. A given combination of PSS and SSS uniquely identifies the physical cell identity of a cell, which can be one of 504 possible identities and which, in combination with the frame timing, is required to decode transmissions from the cell.

Figure 6:
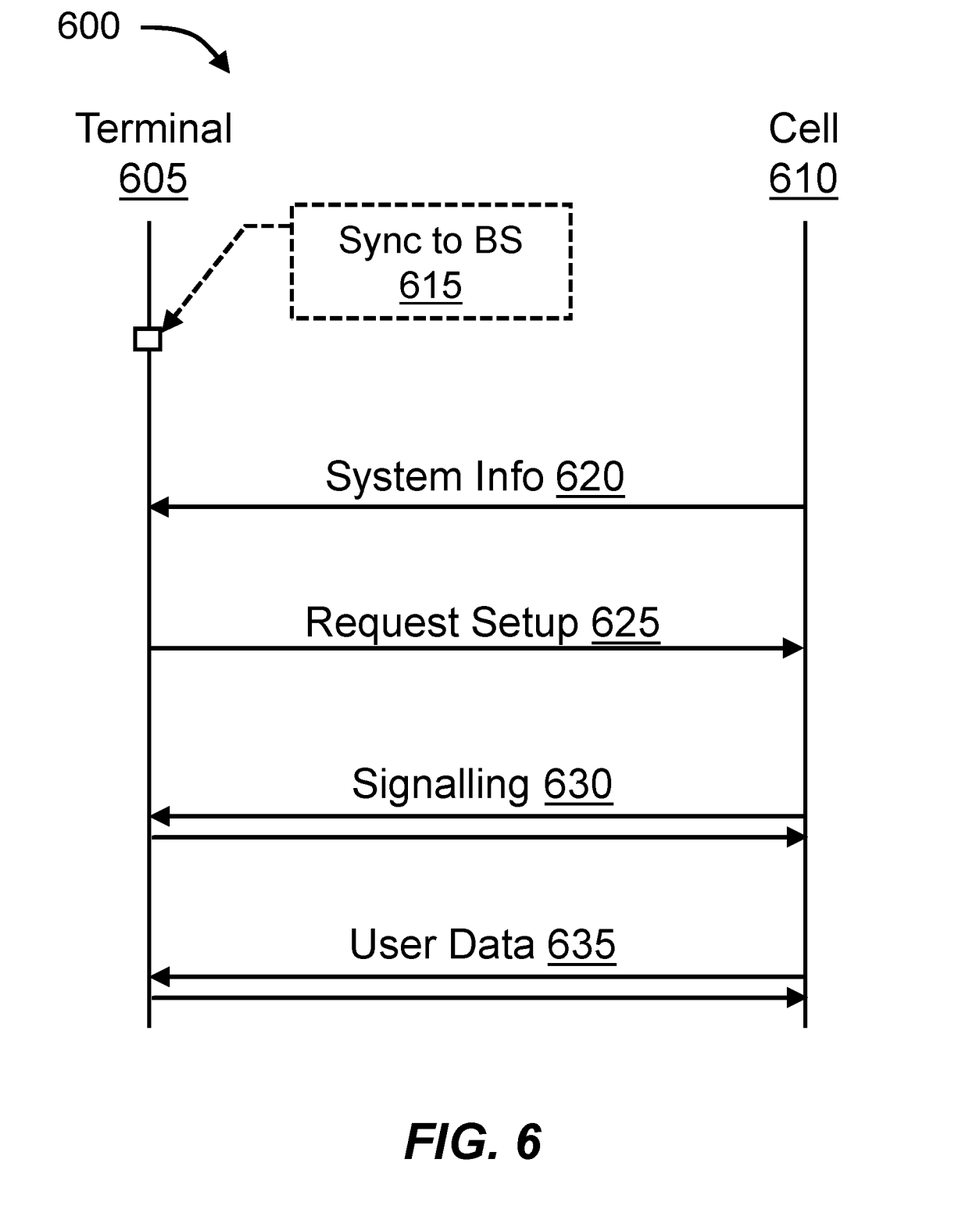
FIG. 6 shows a series of transmissions between a terminal and a cell, by which the terminal connects to the cell and starts receiving and transmitting user data.

FIG. 6 shows a series of transmissions 600 between a terminal 605 and a cell 610, by which the terminal 605 connects to the cell 610 and starts receiving and transmitting user data.

The terminal 605 first synchronises 615 to the timing of transmissions from the cell 610 and determines the physical cell identity, as described above in relation to FIG. 5.

The combination of frame timing and physical cell identity allows the terminal 605 to decode system information 620 that is broadcast from the cell. This includes various information that is required by the terminal in order to connect to the cell, for example including bandwidths and configuration of uplink and downlink transmissions and parameters required for accessing a random access channel. The cell information typically includes a PLMN identifier. The terminal can then, responsive to determining that the PLMN is a non-preferred PLMN (for example a PLMN to which a user of the terminal is not subscribed), abort the process 600 and continue scanning frequencies as described above. If no cell is identified corresponding to a preferred PLMN, the terminal may return to the non-preferred PLMN and continue the process 600, for example in a roaming mode or in a limited-functionality mode that only permits emergency calls.

In some examples, the terminal determines at least one frequency associated with a non-preferred PLMN and inhibits this frequency in the scanning of frequencies. This reduces the time required to connect to a cell of a preferred PLMN, and thereby reduces the required processing and power resources.

Once the terminal 605 has decoded the system information 620, it transmits a message 625 to the cell 610, via a random access channel, requesting connection setup. Signalling messages 630 are then transmitted between the terminal 605 and cell 610 to set up the connection, for example configuring dedicated uplink and/or downlink channels.

The terminal 605 is then fully connected to the cell 610, and can transmit and receive messages 635 comprising user data.

In some examples, responsive to a failure of the cell search operation to establish communication with a cell of the telecommunications network, a terminal performs a further cell search operation. For example, the terminal may perform a first cell search operation that excludes cells of the non-anchor cell list, followed by a second cell search operation that includes cells of the non-anchor cell list.

Figure 7:
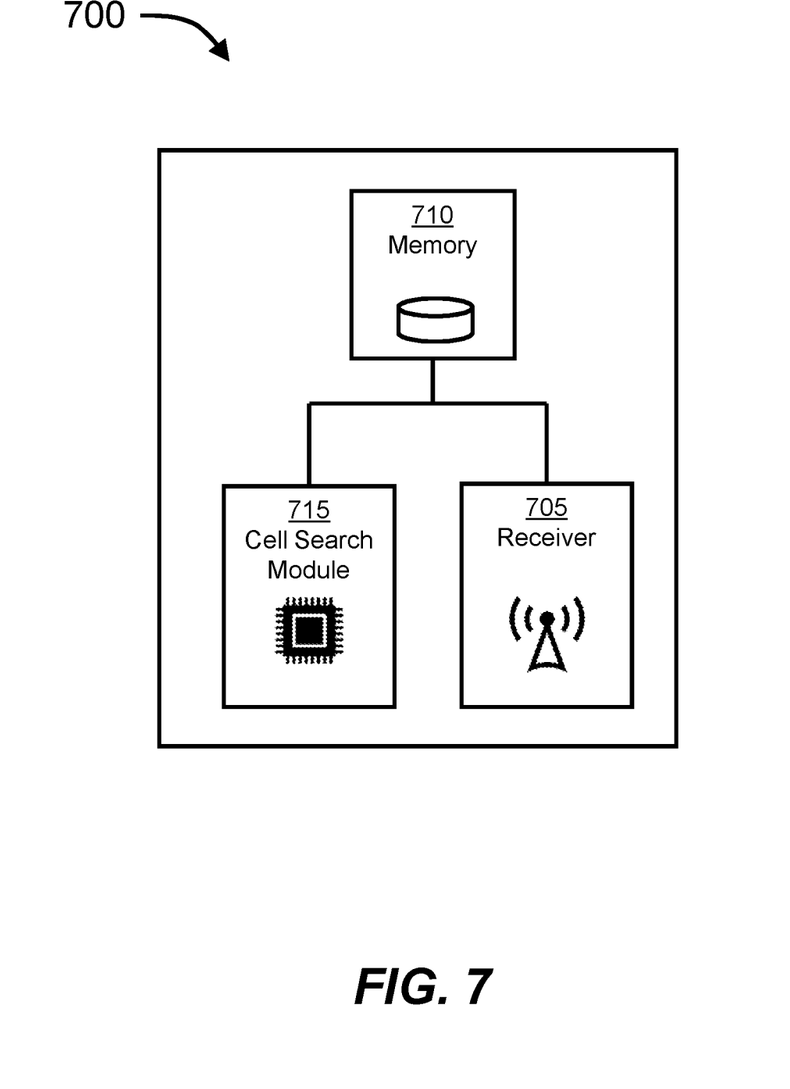
FIG. 7 shows a schematic representation of a terminal for use in a telecommunications system.

FIG. 7 shows a schematic representation of a terminal 700 for use in a telecommunications system, for example as described above. The terminal 700 comprises a receiver 705, a memory 710 and a cell search module 715; these components are communicatively coupled. In some examples, the terminal is an NB-IoT terminal.

The receiver 705 is configured to receive a transmission on an anchor carrier, the transmission including control information.

The receiver 705 is further configured to receive, on the anchor carrier, an allocation of a non-anchor carrier for receiving data, wherein the non-anchor carrier has a frequency.

The memory 710 is configured to store the frequency of the non-anchor carrier. In some examples, the memory is a non-volatile memory such as flash memory or a hard drive. This allows the frequency of the non-anchor carrier to be maintained if the terminal is powered off. In other examples, the memory is a volatile memory such as a primary storage random access memory.

The cell search module 715 is configured to perform a cell search. The cell search comprises scanning a plurality of frequencies for a cell of the telecommunications network. The frequency of the non-anchor carrier is inhibited in the scanning, for example as described above.

Figure 8:
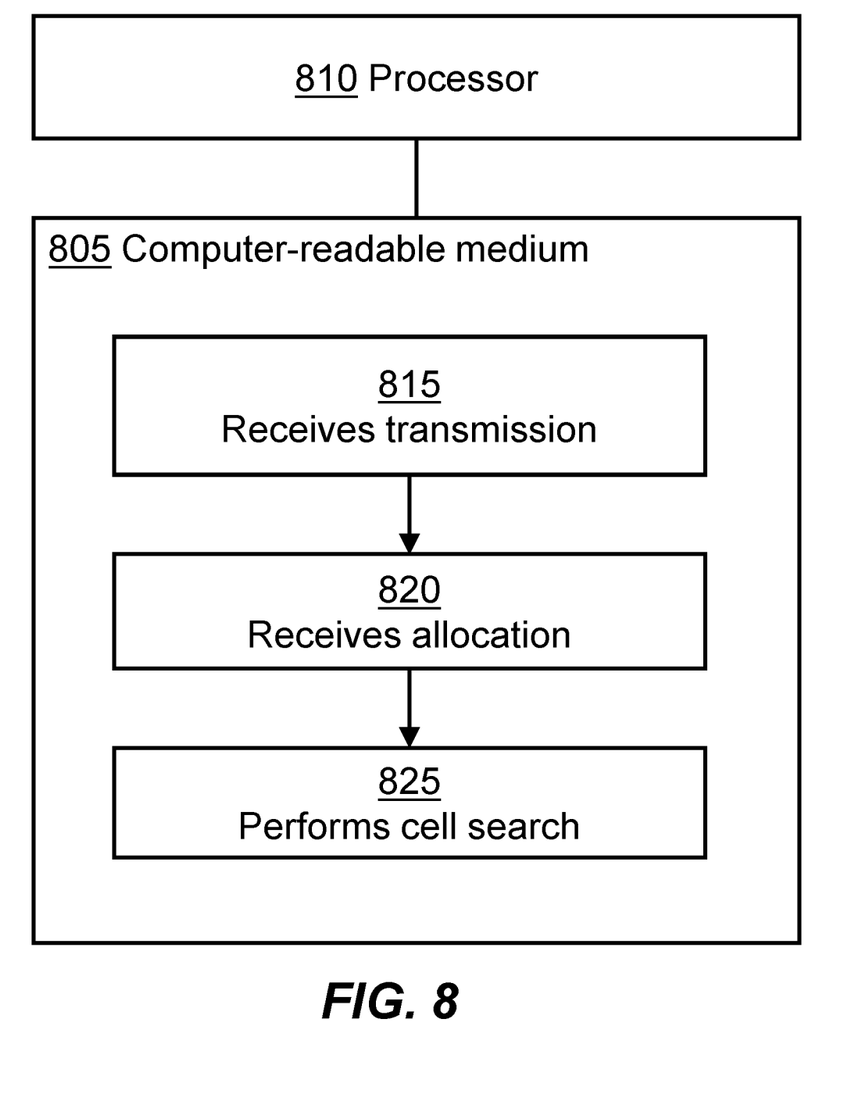
FIG. 8 shows an example of a non-transitory computer-readable storage medium.

FIG. 8 shows an example of a non-transitory computer-readable storage medium 800 comprising a set of computer readable instructions 805 which, when executed by at least one processor 810, cause the at least one processor 810 to perform a method according to examples described herein. The computer readable instructions 805 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

At block 815, the instructions 805 cause the processor 810 to receive a transmission on an anchor carrier. The transmission includes control information.

At block 820, the instructions 805 cause the processor 810 to receive, on the anchor carrier, an allocation of a non-anchor carrier for receiving data, wherein the non-anchor carrier has a frequency.

At block 825, the instructions 805 cause the processor 810 to perform a cell search operation. The cell search operation comprises scanning a plurality of frequencies for a cell of the telecommunications network. The frequency of the non-anchor carrier is inhibited in the scanning.

The above embodiments are to be understood as illustrative examples of the disclosure. Further embodiments of the disclosure are envisaged. For example, the method may be implemented in a cellular telephone. The method may further be implemented in any telecommunications system in which a cell search operation includes a step of scanning multiple frequencies and in which a carrier aggregation scheme is implemented. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method in a terminal configured to receive transmissions from a telecommunications network, the method comprising:
   receiving a transmission on an anchor carrier, the transmission including control information;
   receiving, on the anchor carrier, an allocation of a non-anchor carrier for receiving data, wherein the non-anchor carrier has a frequency;
   adding the frequency of the allocated non-anchor carrier to a non-anchor carrier set;
   dynamically altering the non-anchor carrier set, wherein the dynamic altering comprises:
      determining that a removal condition has been met, wherein the removal condition is that a time elapsed since adding the frequency of the allocated non-anchor carrier to the non-anchor carrier set exceeds a threshold; and
      responsive to determining that the removal condition has been met, removing the frequency of the allocated non-anchor carrier from the non-anchor carrier set; and
   performing a cell search operation, comprising:

scanning a plurality of frequencies for a cell of the telecommunications network, wherein the plurality of frequencies comprise one or more non-anchor carrier frequencies; and inhibiting frequencies of the non-anchor carrier set in the scanning.

2. A method according to claim 1, wherein the removal condition is that a distance travelled by the terminal since adding the frequency of the non-anchor carrier to the non-anchor carrier set exceeds a threshold.

3. A method according to claim 1, comprising:
receiving an indication of a frequency of a further non-anchor carrier; and
adding the frequency of the further non-anchor carrier to the non-anchor carrier set.

4. A method according to claim 1, wherein the plurality of frequencies comprises the frequency of the non-anchor carrier and wherein inhibiting the frequency of the non-anchor carrier comprises:
assigning a first priority to the frequency of the non-anchor carrier;
assigning at least one second priority to at least one respective frequency of the plurality of frequencies, other than the frequency of the non-anchor carrier, wherein the at least one second priority is higher than the first priority; and
scanning the plurality of frequencies in an order based on the assigned first and second priorities.

5. A method according to claim 1, wherein inhibiting the frequency of the non-anchor carrier comprises excluding the non-anchor carrier from the scanning.

6. A method according to claim 1, wherein performing the cell search operation comprises:
determining, for at least one frequency of the plurality of frequencies, whether a transmission has been received on an anchor carrier with that frequency within a time window prior to the performing the cell search;
assigning a priority to the at least one frequency of the plurality based on said determining; and
scanning the plurality of frequencies in an order based on the assigned priorities of the plurality of frequencies.

7. A method according to claim 1, comprising:
determining at least one transmission frequency associated with a non-preferred public land mobile network; wherein
the cell search operation comprises inhibiting the at least one transmission frequency associated with the non-preferred public land mobile network in the scanning.

8. A method according to claim 1 comprising, responsive to a failure of the cell search operation to establish communication with a cell of the telecommunications network, performing a further cell search operation, wherein:
the further cell search operation comprises scanning the frequency of the non-anchor carrier for a cell of the telecommunications network.

9. A terminal for use in a telecommunications system, the terminal comprising:
a receiver configured to:
receive a transmission on an anchor carrier, the transmission including control information;
receive, on the anchor carrier, an allocation of a non-anchor carrier for receiving data, wherein the non-anchor carrier has a frequency;

a memory configured to:
store the frequency of the allocated non-anchor carrier, wherein storing the frequency comprises adding the frequency of the allocated non-anchor carrier to a non-anchor carrier set;
wherein the terminal is configured to:
dynamically alter the non-anchor carrier set, wherein the dynamic altering comprises:
determining that a removal condition has been met, wherein the removal condition is that a time elapsed since adding the frequency of the allocated non-anchor carrier to the non-anchor carrier set exceeds a threshold; and
responsive to determining that the removal condition has been met, removing the frequency of the allocated non-anchor carrier from the non-anchor carrier set; and
wherein the terminal further comprises a cell search module configured to perform a cell search comprising:
scanning a plurality of frequencies for a cell of the telecommunications network, wherein the plurality of frequencies comprise one or more non-anchor carrier frequencies; and
inhibiting frequencies of the non-anchor carrier set in the scanning.

10. A terminal according to claim 9, wherein the memory is a non-volatile memory.

11. A terminal according to claim 9, wherein the terminal is a Narrowband Internet of Things terminal.

12. A non-transitory computer-readable storage medium comprising a set of computer-readable instructions stored thereon which, when executed by at least one processor of a terminal of a telecommunications network, cause the at least one processor to:
receive a transmission on an anchor carrier, the transmission including control information;
receive, on the anchor carrier, an allocation of a non-anchor carrier for receiving data, wherein the non-anchor carrier has a frequency;
add the frequency of the allocated non-anchor carrier to a non-anchor carrier set;
dynamically alter the non-anchor carrier set, wherein the dynamic altering comprises:
determining that a removal condition has been met, wherein the removal condition is that a time elapsed since adding the frequency of the allocated non-anchor carrier to the non-anchor carrier set exceeds a threshold; and
responsive to determining that the removal condition has been met, removing the frequency of the allocated non-anchor carrier from the non-anchor carrier set; and
perform a cell search operation, comprising:
scanning a plurality of frequencies for a cell of the telecommunications network, wherein the plurality of frequencies comprise one or more non-anchor carrier frequencies; and
inhibiting frequencies of the non-anchor carrier set in the scanning.

* * * * *